(12) United States Patent
Nakanishi et al.

(10) Patent No.: US 8,383,292 B2
(45) Date of Patent: Feb. 26, 2013

(54) FUEL CELL

(75) Inventors: Haruyuki Nakanishi, Susono (JP); Yusuke Kuzushima, Kyoto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 596 days.

(21) Appl. No.: 12/600,663

(22) PCT Filed: May 20, 2008

(86) PCT No.: PCT/IB2008/001248
§ 371 (c)(1), (2), (4) Date: Nov. 18, 2009

(87) PCT Pub. No.: WO2008/142527
PCT Pub. Date: Nov. 27, 2008

(65) Prior Publication Data
US 2010/0151363 A1   Jun. 17, 2010

(30) Foreign Application Priority Data

May 21, 2007 (JP) ................................. 2007-134119

(51) Int. Cl.
*H01M 4/36* (2006.01)
(52) U.S. Cl. ........................................ 429/528; 429/523
(58) Field of Classification Search .................. 429/523, 429/528
See application file for complete search history.

(56) References Cited

U.S. PATENT DOCUMENTS

| 7,220,509 B2 * | 5/2007 | Merzougui et al. ........... 429/492 |
| 2004/0043283 A1 | 3/2004 | Cipollini et al. |
| 2006/0099486 A1 | 5/2006 | Sompalli et al. |

FOREIGN PATENT DOCUMENTS

| CN | 1703791 | 11/2005 |
| EP | 1 298 751 A | 4/2003 |
| JP | 62-500271 | 1/1987 |
| JP | 4-502980 | 5/1992 |
| JP | 2004-313900 | 11/2004 |
| JP | 2006-236776 | 9/2006 |
| WO | WO 86/01642 | 3/1986 |
| WO | WO 90/05798 | 5/1990 |
| WO | WO 2006/003182 | 1/2006 |

OTHER PUBLICATIONS

Text of First Office Action for Chinese Appl. No. 200880016778.4 dated Oct. 26, 2011.

\* cited by examiner

*Primary Examiner* — Stuart Hendrickson
(74) *Attorney, Agent, or Firm* — Finnegan, Henderson, Farabow, Garrett & Dunner, LLP

(57) ABSTRACT

In a fuel cell that includes an electrolyte (10), and an anode (20) and a cathode (30) which constitute a pair of electrodes that are arranged sandwiching the electrolyte (10), the cathode (30) includes catalyst particles (24) and trapping particles (38). The catalyst particles (24) operate as catalysts for a reaction that creates hydroxide ions from oxygen, and the trapping particles (38) trap hydrogen peroxide ions.

16 Claims, 5 Drawing Sheets

FIG. 3A

ADDITIVE AMOUNT AND CELL VOLTAGE AT 0.05 A/cm$^2$
(ADDITIVE: TITANIUM OXIDE. TRAPPING LAYER THICKNESS: 10 $\mu$m)

| ADDITIVE AMOUNT (vol.%) | 0 | 10 | 30 | 60 |
|---|---|---|---|---|
| CELL VOLTAGE AT 0.05 A/cm$^2$ | 0.80 | 0.83 | 0.92 | 0.87 |

FIG. 3B

TRAPPING LAYER THICKNESS, ADDITIVE AMOUNT,
AND CELL VOLTAGE AT 0.05 A/cm$^2$
(ADDITIVE: 10 vol.% OF TITANIUM OXIDE)

| TRAPPING LAYER THICKNESS ($\mu$m) | 0 | 5 | 10 | 30 |
|---|---|---|---|---|
| CELL VOLTAGE AT 0.05 A/cm$^2$ | 0.80 | 0.88 | 0.92 | 0.85 |

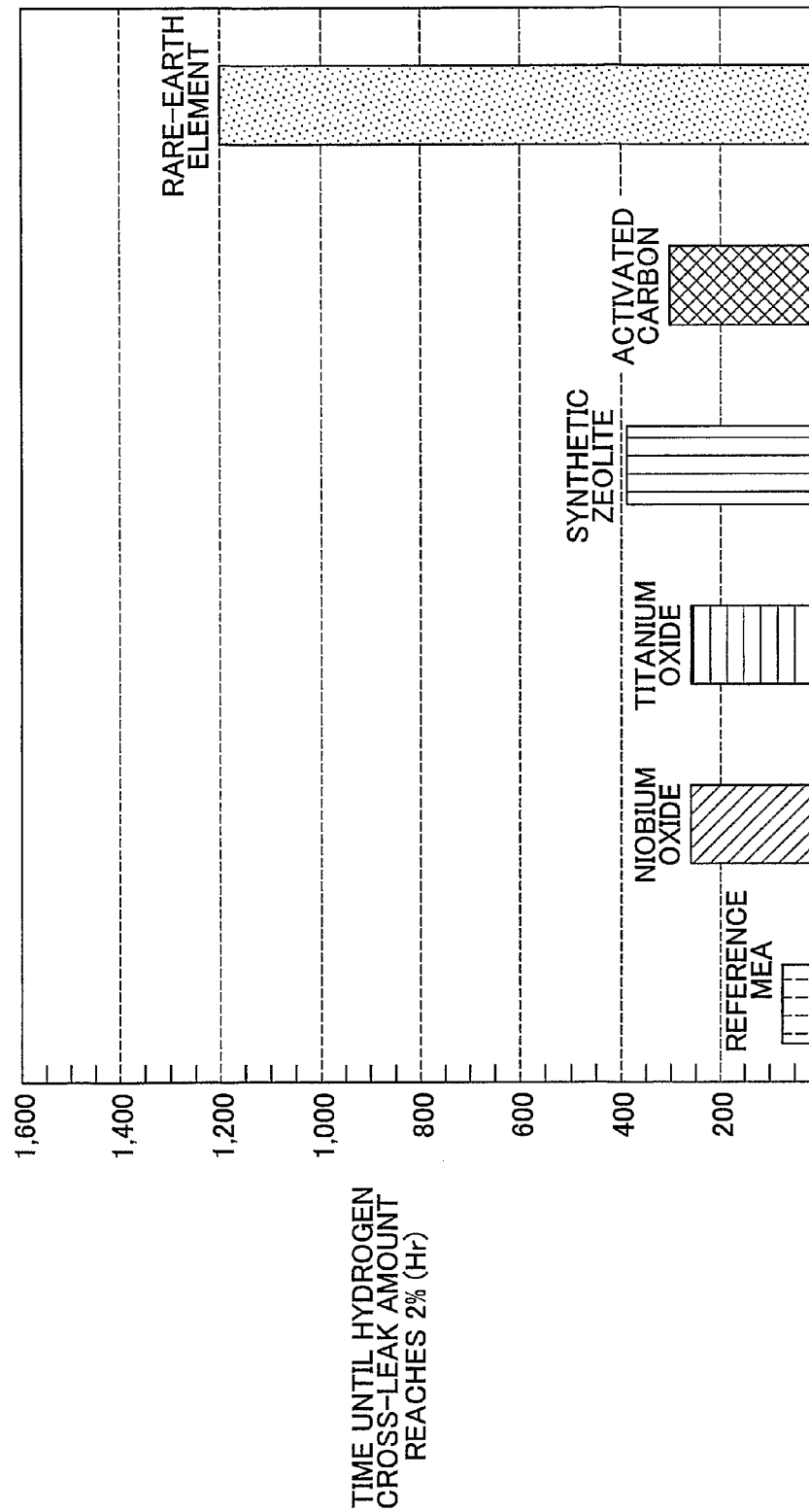

FIG. 7A

ADDITIVE AMOUNT AND CELL VOLTAGE AT 0.05 A/cm$^2$
(TRAPPING LAYER THICKNESS: 30 $\mu$m)

| ADDITIVE AMOUNT (wt.%) | 0 | 10 | 30 | 50 |
|---|---|---|---|---|
| CELL VOLTAGE AT 0.05 A/cm$^2$ | 0.81 | 0.86 | 0.94 | 0.88 |

FIG. 7B

TRAPPING LAYER THICKNESS, ADDITIVE AMOUNT,
AND CELL VOLTAGE AT 0.05 A/cm$^2$
(ADDITIVE AMOUNT: 30 wt%)

| TRAPPING LAYER THICKNESS ($\mu$m) | 0 | 10 | 30 | 50 |
|---|---|---|---|---|
| CELL VOLTAGE AT 0.05 A/cm$^2$ | 0.81 | 0.87 | 0.94 | 0.84 |

FUEL CELL

CROSS-REFERENCE TO RELATED APPLICATIONS

This application is a national phase application of International Application No. PCT/IB2008/001248, filed May 20, 2008, and claims the priority of Japanese Application No. 2007-134119, filed May 21, 2007, the contents of both of which are incorporated herein by reference.

FIELD OF THE INVENTION

The invention relates to a fuel cell. More particularly, the invention relates to a fuel cell which is provided with an electrolyte and a pair of electrodes arranged one on each side of the electrolyte, and which generates electromotive force by a reaction between reactive agents (i.e., fuel and an oxidizing agent) supplied to the electrodes.

BACKGROUND OF THE INVENTION

There are currently a variety of types of fuel cells, including alkaline fuel cells, phosphoric-acid fuel cells, molten carbonate fuel cells, solid oxide fuel cells, and proton exchange membrane fuel cells. For example, in an alkaline fuel cell, a cathode operates as a catalyst that creates hydroxide ions from water and oxygen in the atmosphere which is supplied. The hydroxide ions that are created pass through an electrolyte to an anode, which operates as a catalyst for reacting hydrogen with the hydroxide ions to form water. The fuel cell thus generates electromotive force through the reaction of fuel and air.

For example, Published Japanese Translation of PCT application, JP-T-4-502980, for example, describes electrocatalytic material which is particularly suitable as an electrode catalyst of an alkaline fuel cell. With this electrocatalytic material, fine activated carbon is used as the support material on which single-crystal gold particles having a (100) surface are then deposited. With the alkaline fuel cell described in the foregoing publication, the electrocatalytic particles are highly catalytically active and reduce oxygen to water or hydroxide, as well as reduce hydrogen peroxide ions to water when hydrogen peroxide ions are present.

However, gold, which is used as the electrocatalytic material, is an expensive metal. Therefore, if this kind of electrolytic material is used as the electrode catalyst, the cost of the fuel cell will likely increase. Hence, it is desirable to develop electrolytic material which is formed of a less expensive material yet which is highly catalytically active.

Also, particularly in the cathode, hydrogen peroxide ions may be formed the process of creating hydroxide ions from oxygen. Hydrogen peroxide ions are highly reactive so if they reach the electrolyte as they are, they may damage the electrolyte, causing it to deteriorate. Therefore, it is desirable to inhibit hydrogen peroxide ions formed in the cathode from reaching the electrolyte by trapping them or breaking them down in the cathode.

DISCLOSURE OF THE INVENTION

This invention thus provides a fuel cell having an improved electrode that is highly catalytically active and can inhibit hydrogen peroxide ions from reaching the electrolyte, while reducing costs.

A first aspect of the invention relates to a fuel cell that includes an electrolyte, and an anode and a cathode which constitute a pair of electrodes that are arranged sandwiching the electrolyte. The cathode includes i) catalyst particles which operate as catalysts for a reaction that creates hydroxide ions from oxygen, and ii) trapping particles which trap hydrogen peroxide ions.

According to the fuel cell of this first aspect, even if there are hydrogen peroxide ions present in the cathode, those hydrogen peroxide ions can be reliably trapped by the trapping particles so the amount of hydrogen peroxide ions that reach the electrolyte can be reduced. Accordingly, deterioration of the electrolyte from the hydrogen peroxide ions can be inhibited which improves the durability of the fuel cell.

The trapping particles may also operate as catalysts for a reaction that creates hydroxide ions from hydrogen peroxide ions.

These trapping particles make it possible to increase the amount of hydroxide ions that are created in the cathode, thereby improving the power generating performance of the fuel cell.

The trapping particles may include particles of at least one from among the group consisting of niobium oxide, titanium oxide, synthetic zeolite, activated carbon, and a rare-earth element.

Also, the trapping particles may be fullerenes.

Having the trapping particles be either i) particles that include particles of at least one from among the group consisting of niobium oxide, titanium oxide, synthetic zeolite, activated carbon, and a rare-earth element, or ii) fullerenes enables the hydrogen peroxide ions to be reliably trapped. As a result, deterioration of the electrolyte can be inhibited.

The cathode may include i) a trapping layer which is arranged contacting one side surface of the electrolyte and includes the trapping particles, and ii) a catalyst layer which is arranged contacting the trapping layer and includes the catalyst particles.

According to this cathode, even if hydrogen peroxide ions are formed from the reaction in the catalyst layer, for example, the trapping layer is able to trap those hydrogen peroxide ions. Accordingly, hydrogen peroxide ions can be reliably inhibited from reaching the electrolyte so deterioration of the electrolyte can be effectively inhibited.

The cathode may include a plurality of electrode layers, one of which is arranged contacting the electrolyte, the plurality of electrode layers including the catalyst particles and/or the trapping particles. Further the plurality of electrode layers may be arranged such that the ratio of the trapping particles to the total number of particles which includes the catalyst particles and the trapping particles in the electrode layer decreases farther away from the electrolyte in order from the electrode layer on the side contacting the electrolyte.

That is, an electrode layer with a high ratio of trapping particles may be arranged on the side contacting the electrolyte, and an electrode layer with a high ratio of catalyst particles may be arranged on the outer electrode layer that is away from the electrolyte. Accordingly, even if hydrogen peroxide ions are formed in the reaction that creates hydroxide ions in the outer electrode layer, those hydrogen peroxide ions can be trapped by the trapping particles as they move toward the electrolyte. Accordingly, hydrogen peroxide ions can be reliably inhibited from reaching the electrolyte, thereby effectively suppressing deterioration of the electrolyte.

In particular, an electrolyte that conducts anions tends to be damaged by contact with hydrogen peroxide ions, which are anions. However, providing a trapping layer in the cathode of an alkaline fuel cell having an electrolyte that conducts anions inhibits the electrolyte from being damaged by the hydrogen peroxide ions.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIGS. 3A and 3B are charts showing the relationship between cell voltage and a trapping layer of the electrode catalyst of the fuel cell according to the first example embodiment of the invention;

FIG. 4 is a graph showing the relationship between trapping particles used as the trapping layer and the durability of an anion-exchange membrane of the fuel cell according to the first example embodiment of the invention;

FIGS. 7A and 7B are charts showing the relationship between cell voltage and a trapping layer of the fuel cell according to the third example embodiment of the invention.

DETAILED DESCRIPTION OF THE EMBODIMENTS

Figure 1:
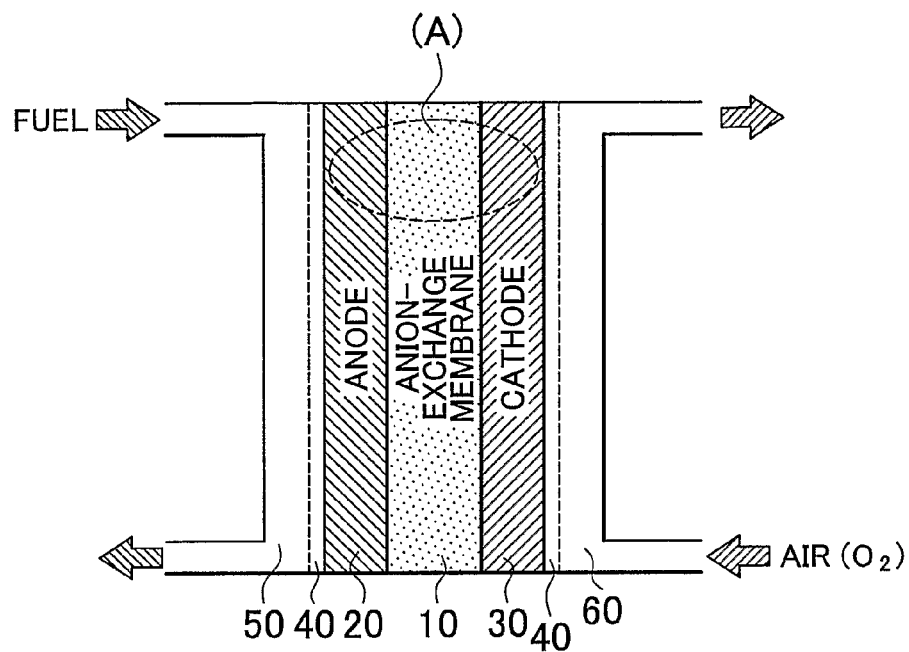
FIG. 1 is a view showing a frame format of a fuel cell according to a first example embodiment of the invention.

Hereinafter, example embodiments of the invention will be described in detail with reference to the accompanying drawings. Incidentally, in the following description, like or corresponding parts will be denoted by like reference numerals and detailed descriptions of those parts will not be repeated.

FIG. 1 is a view showing a frame format of the structure of a fuel cell according to a first example embodiment of the invention. The fuel cell shown in FIG. 1 is an alkaline fuel cell. This fuel cell has an anion-exchange membrane 10 (electrolyte). An anode 20 is arranged on one side of the anion-exchange membrane 10 and a cathode 30 is arranged on the other side of the anion-exchange membrane 10. A collector plate 40 is arranged on the outer side of both the anode 20 and the cathode 30. A fuel passage 50, which is connected to a fuel supply (not shown), is connected to the collector plate 40 on the anode 20 side. Fuel is supplied from the fuel supply to the anode 20 via the fuel passage 50 and the collector plate 40, and unreacted fuel and the like is discharged from the anode 20 to the fuel passage 50 side. Meanwhile, an oxygen passage 60 is connected to the collector plate 40 on the cathode 30 side. Air is supplied to the cathode 30 via the oxygen passage 60 and the collector plate 40, and air offgas that contains unreacted oxygen is discharged from the cathode 30 to the oxygen passage 60 side.

When generating power with a fuel cell, fuel containing hydrogen, such as ethanol, for example, is supplied as the fuel to the anode 20, while air (or oxygen) is supplied to the cathode 30. When fuel is supplied to the anode 20, the electrocatalytic layer of the anode 20 promotes a reaction between the hydrogen atoms in the fuel and hydroxide ions that have passed through the anion-exchange membrane 10.

As a result, water is formed and electrons are released. When pure hydrogen is used as the fuel, the reaction at the anode 20 is as shown in Expression (1) below. When ethanol is used as the fuel, the reaction at the anode 20 is as shown in Expression (2) below.

$$H_2 + 2OH^- \rightarrow 2H_2O + 2e^- \quad (1)$$

$$CH_3CH_2OH + 12OH^- \rightarrow 2CO_2 + 9H_2O + 12e^- \quad (2)$$

Meanwhile, when air is supplied to the cathode 30, a cathode catalyst layer of the cathode 30, which will be described later causes oxygen molecules in the air to go through several stages where they acquire electrons from the electrode to create hydroxide ions. The hydroxide ions then pass through the anion-exchange membrane 10 to the anode 20 side. This reaction at the cathode 30 is as shown in Expression (3) below.

$$\tfrac{1}{2}O_2 + H_2O + 2e^- + 2e^- \rightarrow 2OH^- \quad (3)$$

When reactions on the anode 20 side and the cathode 30 side such as those described above are put together, a water-forming reaction such as that shown in Expression (4) below takes place in the overall fuel cell. The electrons at this time travel through the collector plates 40 on both electrode sides, and as a result, current flows and power is generated.

$$H_2 + \tfrac{1}{2}O_2 \rightarrow H_2O \quad (4)$$

In this kind of alkaline fuel cell, the anion exchange membrane 10 is not particularly limited as long as it is a medium that can transport hydroxide ions ($OH^-$) created at the catalyst electrode of the cathode 30 to the anode 20. More specifically, the anion-exchange membrane 10 may be, for example, a solid polymer membrane (i.e., an anion exchange resin) having an anion exchange group such as a primary, secondary, or tertiary amino group, a quaternary ammonium group, a pyridyl group, an imidazole group, a quaternary pyridinium group, and a quaternary imidazolium group. Also, the membrane of the solid polymer may be, for example, a hydrocarbon system or a fluorine system resin.

Figure 2:
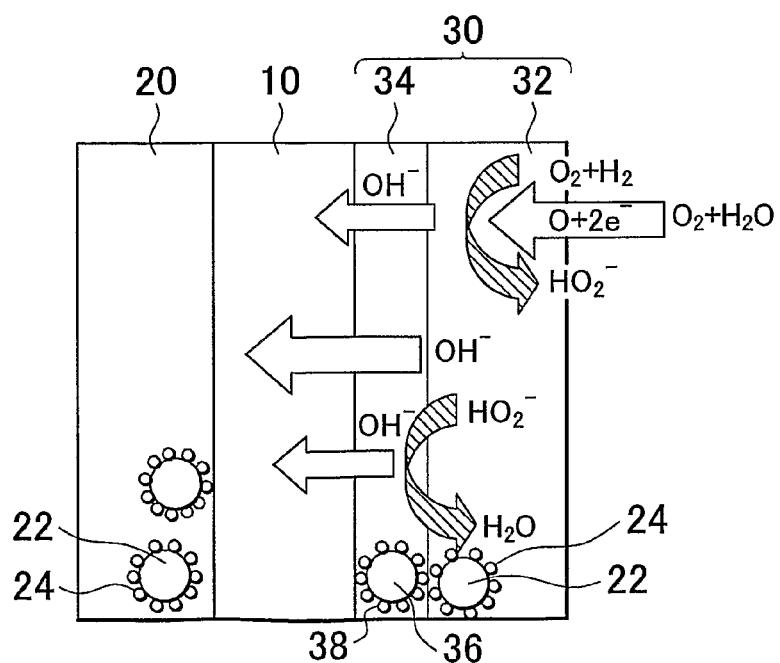
FIG. 2 is a diagram showing an electrode catalyst of the fuel cell according to the first example embodiment of the invention.

FIG. 2 is an enlarged view showing a frame format of the portion encircled by the dotted line (A) in FIG. 1. As shown in FIG. 2, the anode 20 is formed by a catalyst layer. That is, the anode 20, i.e., the catalyst layer, is made of catalyst electrode carrier bodies (hereinafter referred to "catalyst carrier bodies") each of which is made up of a carrier particle 22 made of carbon or the like carrying catalyst particles 24. The anode 20 is formed by mixing these catalyst carrier bodies in a solution of melted electrolyte membrane that is the same as the anion-exchange membrane 10, and then applying this mixture to one side surface the anion-exchange membrane 10.

Meanwhile, the cathode 30 has at least a catalyst layer 32 and a trapping layer 34. The catalyst layer 32 is the same as the catalyst layer of the anode 20. That is, the catalyst layer 32 is formed of catalyst carrier bodies each of which is made up of a carrier particle 22 made of carbon or the like carrying catalyst particles 24. The trapping layer 34 is provided between the catalyst layer 32 and the anion-exchange membrane 10. This trapping layer 34 is formed of trapping layer carrier bodies (hereinafter referred to as "trapping carrier bodies") each of which is made up of a carrier 36 made of carbon or the like carrying titanium oxide 38 as the trapping particles. These trapping carrier bodies will be described later.

The catalyst layer 32 of the cathode 30 is 400 [μm] thick and the trapping layer 34 is in the range of 5 to 30 [μm] thick. Also, the ratio of the titanium oxide 38 to the volume of all of the trapping carrier bodies in the trapping layer 34 is within the range of 10 to 50 [Vol. %].

The trapping layer 34 is formed by mixing these trapping carrier bodies in a solution of melted electrolyte membrane that is the same as the anion-exchange membrane 10, and then applying this mixture to the surface of the anion-exchange membrane 10 on the opposite side from the surface contacting the anode 20. The catalyst layer 32 is formed by mixing the catalyst carrier bodies in an electrolyte solution and then applying the mixture to the surface of the trapping layer 34.

Here, the catalyst layer of the anode 20 operates as a catalyst for stripping the hydrogen atoms from the fuel that is supplied and reacting them with hydroxide ions that have passed through the anion-exchange membrane 10, thereby creating water ($H_2O$) and releasing electrons ($e^-$) to the collector plate 24, as shown in Expressions (1) and (2) above. Also, the catalyst layer 32 of the cathode 30 operates as a catalyst for acquiring the electrons ($e^-$) from the collector plate 40 and thereby creating hydroxide ions from the oxygen ($O_2$) and the water ($H_2O$), as shown in Expression (3) above.

The electrode carrier bodies of the catalyst layers are not particularly limited as long as they activate the catalytic reactions of the anode 20 and cathode 30 described above. More specifically, for example, the catalyst particles 24 could be Fe, Co, Ni, or Pt, or an alloy of these. Also, carbon or the like could be used as the carrier 22.

In the catalyst layer 32 of the cathode 30, not all of the oxygen that is supplied becomes hydroxide ions as in Expression (3). Hydrogen peroxide ions ($HO_2^-$) may also be formed in the process of creating hydrogen ions, as shown in Expression (5) below, and these hydrogen peroxide ions may remain.

$$O_2 + H_2O + 2e^- \rightarrow HO_2^- + OH^- \quad (5)$$

When a catalyst layer is arranged contacting an anion-exchange membrane, as is the case with a fuel cell, the hydrogen peroxide ions that are formed, together with the hydroxide ions, reach the anion-exchange membrane as they are and penetrate the anion-exchange membrane. Hydrogen peroxide ions are more reactive than hydroxide ions so if they penetrate the anion-exchange membrane, they may damage it, causing it to deteriorate.

In contrast, with the fuel cell according to the first example embodiment, the trapping layer 34 that traps the formed hydrogen peroxide ions to prevent them from reaching the anion-exchange membrane 10 is arranged contacting the anion-exchange membrane 10. More specifically, the titanium oxide 38 of the trapping layer 34 either traps the hydrogen peroxide ions in the cathode 30 or operates as a catalyst that reacts the hydrogen peroxide ions with water to create hydrogen ions, as shown in Expression (6) below.

$$HO_2^- + H_2O + 2e^- \rightarrow 3OH^- \quad (6)$$

Accordingly, even if hydrogen peroxide ions are formed in the process of the catalytic reaction in the catalyst layer 32 to the outside of the trapping layer 34 (i.e., on the side opposite the anion-exchange membrane 10), the hydrogen peroxide ions will either be turned into hydroxide ions or trapped as they are in the titanium oxide 38 in the trapping layer 34 as they attempt to pass through it. As a result, the anion-exchange membrane 10 can be prevented from deteriorating due to hydrogen peroxide ions. Also at the same time, hydroxide ions are created from the hydrogen peroxide ions so the oxygen utilization improves. Therefore, the power generating efficiency of the fuel cell can be improved.

FIG. 3A shows the change in the voltage [V] when the ratio (additive amount) [Vol. %] of the titanium oxide 38 in the trapping layer 34 is changed and the thickness of the trapping layer 34 is 10 [μm] and the current density is 0.05 [A/cm²]. As shown in FIG. 3A, the voltage [V] is higher in all cases when the ratio of the titanium oxide 38 is 10, 30, and 60 [Vol. %], than it is when the ratio of titanium oxide is 0 (i.e., than it is with only a related or conventional MEA). That is, regardless of the titanium oxide ratio, the cell voltage can be increased to some degree by providing the trapping layer 34 that has the titanium oxide 38. However, in order to obtain even better power generating performance, it is desirable that the ratio be between 10 to 50 [Vol. %], inclusive.

FIG. 3B shows the detected change in the cell voltage [V] when the thickness [μm] of the trapping layer 34 is changed and the content of titanium oxide 38 in the trapping layer 34 is 10 [Vol. %] and the current density is 0.05 [A/cm²]. As is evident from the drawing, the cell voltage [V] is higher, regardless of the thickness of the trapping layer 34, than it is when the thickness of the trapping layer 34 is 0, i.e., than it is with an MEA in which the cathode 30 does not have the trapping layer 34. From this it is conceivable that providing the trapping layer 34, regardless of its thickness, enables the power generating efficiency to be improved over that of a related or conventional fuel cell. However, in order to more reliably demonstrate this function to improve power generating performance, it is preferable that the thickness of the trapping layer 34 be within the range of 5 to 30 [μm], inclusive.

In this first example embodiment, the titanium oxide 38 is used as the trapping particles of the trapping layer 34. However, the invention is not limited to the trapping particles being titanium oxide 38. For example, other than the titanium oxide 38, the trapping particles may also be particles of, for example, niobium oxide, synthetic zeolite, activated carbon, or a rare-earth element such as lanthanum.

FIG. 4 shows the time [Hr] that it takes for the cross-leak amount of hydrogen in the anion-exchange membrane 10 to reach 2 [%] when particles of any one of these are used as the trapping particles of the trapping layer 34. The reason for the increase in the cross-leak amount of hydrogen in the anion-exchange membrane 10 here is thought to because deterioration of the anion-exchange membrane 10 has progressed. Therefore, in this case, the cross-leak amount of 2 [%] is taken as the reference for a deteriorated state of the anion-exchange membrane 10, and the time [Hr] until this reference is reached is checked.

As is evident from FIG. 4, it takes longer for the anion-exchange membrane 10 to deteriorate when the trapping layer 34 is present, regardless of whether niobium oxide, titanium oxide, synthetic zeolite, activated carbon, or a rare-earth element is used, than it does with a normal MEA that does not have the trapping layer 34, so it is evident that the trapping layer 34 inhibits deterioration from progressing. Also, when a rare-earth element is used, it takes longer to reach the cross-leak amount of 2 [%]. In particular, the trapping layer 34 is very effective for trapping the hydrogen peroxide ions. However, in addition to trapping hydrogen peroxide ions, it is preferable that the type of trapping particles of the trapping layer 34 be determined taking into account factors such as how highly catalytically active they are with respect to a reaction that creates hydroxide ions from hydrogen peroxide ions, and how low their resistance is.

Incidentally, the trapping particles of the invention are not limited to the types of particles described above. That is, other particles may be used instead as long as they enable the trapping layer 34 to trap hydrogen peroxide ions. Also, the trapping layer 34 is not limited to being formed of carrier bodies that carry these trapping particles. For example, the trapping layer 34 may also be structured in such a way that it uses these trapping particles directly. Incidentally, these statements related to the types of trapping particles also apply to a second example embodiment.

Also, in the first example embodiment, values were obtained for the thickness of the trapping layer 34 and the ratio of the particles (i.e., the additive amount) as described above. However, the trapping layer of the invention is not limited to the thickness and ratio described above. For example, the thickness of the trapping layer 34 may also be determined taking into account the thickness of the catalyst layer 32. More specifically, when the titanium oxide 38 is used as the trapping particles, the thickness of the trapping layer 34 is preferably 15 to 100%, and more preferably 50 to 100%, of the thickness of the catalyst layer 32 (i.e., the thickness ratio of the trapping layer 34 to the catalyst layer is 15~100:100, and more preferably 50~100:100). This also applies to a third example embodiment.

Furthermore, in the above description, the catalyst layers of both electrodes are formed of catalyst electrode carrier bodies in which the catalyst particles 24 are carried on carriers 22. However, in the invention the catalyst layer is not limited to this kind of catalyst carrier bodies. For example, the catalyst layers may be made of Fe, Co, Ni, or Pt, or the like, or an organometallic complex having these metal atoms as a central metal, or carriers carrying such an organometallic complex. Also, a diffusion layer made of porous material or the like may also be arranged on the surface of the catalyst layer of each electrode. This also applies to the following example embodiments.

Also, the fuel cell described in the example embodiment of this example embodiment has only one MEA in which the pair of electrodes (i.e., the anode 20 and the cathode 30) are arranged one on each side of the anion-exchange membrane 10, and the accumulator plate 40 and one of the reaction gas passages 50 or 60 are arranged on the outer sides of those electrodes. However, the structure of the fuel cell of the invention is not limited to the structure shown in FIG. 1. For example, instead of having only one MEA, the fuel cell may also have a stacked structure in which a plurality of MEAs are connected together in series via separators that include collector plates. In this case as well, the cathode 30 of each MEA has the catalyst layer 32 and the trapping layer 34 as described above so the power generating performance of the fuel cell can be improved while deterioration of the anion-exchange membrane 10 of each MEA can be prevented. Incidentally, in this case as well, a diffusion layer may also be arranged on the surface of the catalyst layer of both the anode 20 and the cathode 30. This also applies to the following example embodiments.

Also, the fuel cell in the first example embodiment is an alkaline fuel cell that uses the anion-exchange membrane 10. However, the invention is not limited to this kind of fuel cell. For example, the fuel cell may alternatively be an alkaline fuel cell or the like that uses an electrolyte that conducts anions, such as KOH, instead of the anion-exchange membrane 10. In this case as well, deterioration of the electrolyte can be suppressed by inhibiting hydrogen peroxide ions from penetrating the electrolyte. Also, the electrodes in the first example embodiment are effective when applied to alkaline fuel cells, but the invention is not limited to an alkaline fuel cell. That is, the invention may also be used with a proton exchange membrane fuel cell (PEFC) (also known as a polymer electrolyte fuel cell (PEFC)) that uses a proton exchange membrane as the electrolyte membrane. In this case as well, hydrogen peroxide ions can be inhibited from forming at the cathode, while hydroxide ions can simultaneously be effectively created from hydrogen peroxide ions. As a result, deterioration of the electrolyte membrane can be suppressed, while power generating efficiency can be improved. This also applies to the following example embodiments.

Figure 5:
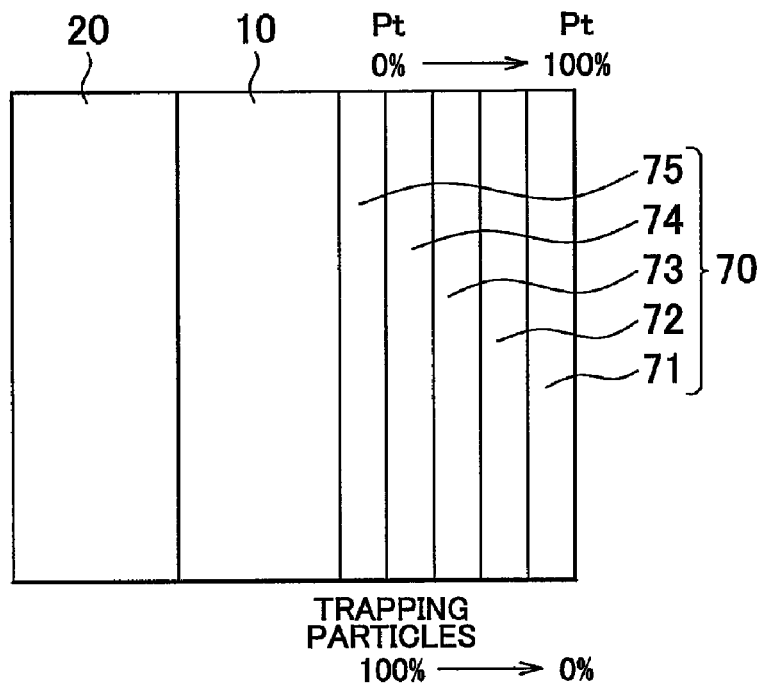
FIG. 5 is a view showing a frame format of a fuel cell according to a second example embodiment of the invention.

FIG. 5 is a view showing a frame format of a fuel cell according to a second example embodiment of the invention. More specifically, FIG. 5 is an enlarged view showing a frame format of the portion encircled by the dotted line (A) in FIG. 1. The fuel cell in FIG. 5 has the same structure as the fuel cell in FIG. 1 with the exception of the structure of the cathode 30. As shown in FIG. 5, an anode 20 is arranged on one side of the anion-exchange membrane 10 of the fuel cell and a cathode 70 is arranged on the other side of the anion-exchange membrane 10 of the fuel cell. The anode 20 is the similar to the anode 20 in the first example embodiment described above.

On the other hand, the cathode 70 has a structure in which a plurality of electrode layers 71 to 75 are stacked together. The electrode layer 71 which is arranged on the outside farthest away from the anion-exchange membrane 10 has the same structure as the anode 20. That is, only catalyst carrier bodies in which catalyst particles 24 are carried on carriers 22 are mixed with an electrolyte solution and then this mixture is applied.

Meanwhile, the catalyst layer 75 that contacts the anion-exchange membrane 10 has the same structure as the trapping layer 34 in the first example embodiment. That is, only trapping carrier bodies in which titanium oxide 38 is carried on carriers 36 are mixed with an electrolyte solution, and that mixture is applied.

Catalyst carrier bodies and trapping carrier bodies are mixed in with the electrode layers 72 to 74 between the outermost electrode layer 71 and the inside electrode layer 75. The ratio of the trapping carrier bodies to the total number of carrier bodies, which includes the catalyst carrier bodies and the trapping carrier bodies, is 100 [%] in the electrode layer 75 contacting the anion-exchange membrane 10, and progressively decreases in the electrode layers 74, 73, and 72, in that order, the farther they are from the anion-exchange membrane 10 until it is 0 [%] in the outermost electrode layer 71. In contrast, the amount of catalyst carrier bodies with respect to the total number of carrier bodies is 0 [%] in the electrode layer 75 contacting the anion-exchange membrane 10, and progressively increases in the electrode layers 74, 73, and 72, in that order, the farther they are from the anion-exchange membrane 10 until it is 100 [%] in the outermost electrode layer 71.

Air is supplied from the oxygen passage 60 that is arranged contacting the outer side of the cathode 70. Therefore, near the outermost electrode layer 71 that contacts the oxygen passage 60 it is necessary to activate a catalytic reaction that creates hydroxide ions from oxygen. Accordingly, the ratio of normal catalyst carrier bodies is 100 [%] in the outermost electrode layer 71 and progressively decreases toward the inside away from the oxygen passage 60.

Meanwhile, when hydroxide ions that have formed at the outermost layer pass through and hydrogen peroxide ions are formed and move to the inside in the area contacting the anion-exchange membrane 10, those hydrogen peroxide ions must be prevented from penetrating the anion-exchange membrane 10. Therefore, the ratio of trapping carrier bodies that work to either trap the hydrogen peroxide ions or turn them into hydroxide ions is made larger closer to the anion-exchange membrane 10. Also, in order to reliably prevent hydrogen peroxide ions from penetrating the anion-exchange membrane 10, the ratio of the trapping carrier bodies is set to be 100 [%] in the electrode layer 75 that contacts the anion-exchange membrane 10.

In this way, having a structure having the electrode layers 71 to 75 each having a different ratio of catalyst carrier bodies to trapping carrier bodies makes it possible to simultaneously inhibit hydrogen peroxide ions that form from penetrating the anion-exchange membrane 10, while inducing a catalytic reaction that efficiently creates hydroxide ions from oxygen.

Incidentally, in the second example embodiment, the cathode 70 is formed of five layers, i.e., the electrode layers 71 to 75, in which the ratio of catalyst carrier bodies gradually increases toward the outside. However, the number of stacked electrode layers of the cathode 70 is not limited to five. That is, there may be any number of stacked electrode layers as long as there are at least two.

Also, the invention is not limited to adjusting the ratio of trapping carrier bodies to catalyst carrier bodies by five separate electrode layers as described above. For example, the cathode may be just one layer with trapping carrier bodies and catalyst carrier bodies mixed into it at a distribution that has been adjusted such that the trapping carrier bodies increase in number in the portion near the anion-exchange membrane 10 while the catalyst carrier bodies increase in number in the outside portion away from the anion-exchange membrane 10.

Figure 6:
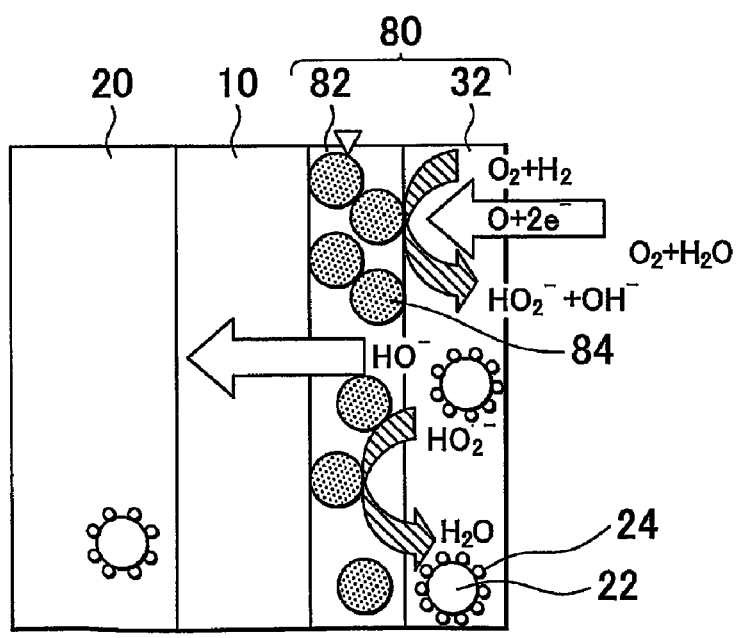
FIG. 6 is a view showing a frame format of a fuel cell according to a third example embodiment of the invention.

FIG. 6 is view showing a frame format of a fuel cell according to a third example embodiment of the invention. FIG. 6 shows a portion corresponding to the portion encircled by the dotted line (A) in FIG. 1. The fuel cell in FIG. 6 has a structure similar to that of the fuel cell in FIG. 1, with the exception of the trapping layer of the cathode.

More specifically, a cathode 80 of the fuel cell in FIG. 6 has a trapping layer 82 to the inside of the catalyst layer 32. The trapping layer 82 is a layer that has fullerenes ($C_{60}$) 84 mixed in with a catalyst layer. More specifically, the amount of fullerenes ($C_{60}$) 84 that are mixed in is within the range of 5 to 30 [wt. %], inclusive, of the weight of the entire trapping layer 82 that includes electrolyte solution. Also, the thickness of the trapping layer 82 is 5 to 40 [μm], inclusive. The trapping layer 82 is formed by mixing catalyst carrier bodies and the fullerenes ($C_{60}$) 84 in an electrolyte solution, and applying this mixture to the surface of the anion-exchange membrane 10.

The fullerenes ($C_{60}$) 84 either trap hydrogen peroxide ions or operate as catalysts for a reaction that reduces them to hydroxide ions. Therefore, it is possible to prevent the hydrogen peroxide ions from penetrating the anion-exchange membrane 10 and thus inhibit the anion-exchange membrane 10 from deteriorating by using the trapping layer 82 in which the fullerenes ($C_{60}$) 84 are mixed in with a catalyst layer instead of the trapping carrier bodies that include the titanium oxide 38 of the first example embodiment.

FIG. 7A is a chart showing the detected cell voltage [V] when the amount [wt. %] of fullerenes ($C_{60}$) 84 mixed into the trapping layer 82 is changed and the thickness of the trapping layer 82 is 30 [μm] and the current density is 0.05 [A/cm$^2$] in a fuel cell according to the third example embodiment of the invention. As is evident from FIG. 7A, the cell voltage is higher, regardless of the additive amount of the fullerenes ($C_{60}$) 84, than it is when the additive is 0, i.e., than it is with a conventional MEA that does not have a trapping layer. Also, in particular, the cell voltage is high when the additive amount is within a range of 10 to 50 [wt. %], with the cell voltage peaking when the additive amount is 30 [wt. %]. However, taking cell resistance and the like into account, it is preferable that the additive amount of the fullerenes ($C_{60}$) 84 be approximately 5 to 30 [wt. %], inclusive.

FIG. 7B is a chart showing the change in the cell voltage [V] when the thickness of the trapping layer 82 of the fuel cell according to the third example embodiment is changed and the additive amount of the fullerenes ($C_{60}$) 84 in the trapping layer 82 is 30 [wt. %] and the current density is 0.05 [A/cm$^2$]. As shown in FIG. 7B, the cell voltage is higher, regardless of the thickness of the trapping layer 82, than it is when the membrane thickness is 0, i.e., than it is with a conventional MEA that does not have the trapping layer 82. Also, in particular, the cell voltage is reliably higher when the trapping layer has a thickness of at least 10 to 50 [μm], inclusive, with the cell voltage peaking when the trapping layer thickness is 30 [μm]. However, taking cell resistance and the like into account, it is preferable that the thickness of the trapping layer 82 be approximately 5 to 40 [μm], inclusive.

However, the trapping layer is not limited to having a thickness of 10 to 50 [μm], i.e., it may have a different thickness. Also, the thickness of the trapping layer 82 is preferably determined taking the thickness of the catalyst layer 32 into account. More specifically, the thickness of the trapping layer 82 is preferably 15 to 150 [%], and more preferably 50 to 100 [%], of the thickness of the catalyst layer 32. This range enables the trapping layer 82 to be even more effective.

Incidentally, in the third example embodiment, the fullerenes ($C_{60}$) 84 are mixed in with a catalyst layer which then serves as a trapping layer. However, the trapping layer particles used here are not limited to fullerenes $C_{60}$. That is, the trapping layer particles may instead be other fullerenes, such as a fullerene dimmer consisting of two fullerenes ($C_{70}$, $C_{84}$, or $C_{60}$), or fullerenes $C_{120}$ or $C_{180}$ or the like.

In the foregoing example embodiments, various numbers are referred to with respect to the number of elements, quantities, amounts, ranges and the like. However, the invention is not limited to those numbers. Also, the invention is also not limited to the structure and method steps and the like described in the foregoing example embodiments.

The invention claimed is:

1. A fuel cell comprising:
an electrolyte; and
an anode and a cathode which constitute a pair of electrodes that are arranged sandwiching the electrolyte,
wherein the cathode includes i) catalyst particles which operate as catalysts for a reaction that creates hydroxide ions from oxygen, and ii) trapping particles which trap hydrogen peroxide ions,
wherein the electrolyte selectively conducts anions and is an anion-exchange membrane, and
wherein the cathode includes a plurality of electrode layers, one of which is arranged contacting the electrolyte, the plurality of electrode layers including at least one of the catalyst particles and the trapping particles; and the plurality of electrode layers are arranged such that the ratio of the trapping particles to the total number of particles which includes the catalyst particles and the trapping particles in the electrode layer decreases farther away from the electrolyte in order to form the electrode layer on the side contacting the electrolyte.

2. The fuel cell according to claim 1, wherein the trapping particles also operate as catalysts for a reaction that creates hydroxide ions from hydrogen peroxide ions.

3. The fuel cell according to claim 1, wherein the trapping particles include particles of at least one from among the group consisting of niobium oxide, titanium oxide, synthetic zeolite, activated carbon, and a rare-earth element.

4. The fuel cell according to claim 1, wherein the cathode includes i) a trapping layer which is arranged contacting one side surface of the electrolyte and includes the trapping particles, and ii) a catalyst layer which is arranged contacting the trapping layer and includes the catalyst particles.

5. The fuel cell according to claim 4, wherein a thickness of the trapping layer is 5 to 30 μm, inclusive.

6. The fuel cell according to claim 4, wherein the trapping particles are carried on carrier bodies so as to form trapping carrier bodies, and a ratio of trapping particles to a volume of total trapping carrier bodies in the trapping layer is 10 to 50 Vol. %, inclusive.

7. The fuel cell according to claim 4, wherein the thickness of the trapping layer is 15 to 100%, inclusive, of the thickness of the catalyst layer.

8. The fuel cell according to claim 7, wherein the thickness of the trapping layer is 50 to 100%, inclusive, of the thickness of the catalyst layer.

9. The fuel cell according to claim 4, wherein the trapping layer is adapted to trap the hydrogen peroxide ions to prevent the hydrogen peroxide ions from reaching the anion-exchange membrane.

10. A fuel cell comprising:
an electrolyte; and
an anode and a cathode which constitute a pair of electrodes that are arranged sandwiching the electrolyte,
wherein the cathode includes i) catalyst particles which operate as catalysts for a reaction that creates hydroxide ions from oxygen, and ii) trapping particles which trap hydrogen peroxide ions,
wherein the electrolyte selectively conducts anions and is an anion-exchange membrane, and
wherein the trapping particles are fullerenes.

11. The fuel cell according to claim 10, wherein the cathode includes i) a trapping layer which is arranged contacting one side surface of the electrolyte and includes the trapping particles, and ii) a catalyst layer which is arranged contacting the trapping layer and includes the catalyst particles.

12. The fuel cell according to claim 11, wherein the amount of fullerenes is 5 to 30 wt. %, inclusive, of the weight of the entire trapping layer.

13. The fuel cell according to claim 11, wherein the thickness of the trapping layer is 5 to 40 μm, inclusive.

14. The fuel cell according to claim 11, wherein the thickness of the trapping layer is 15 to 150%, inclusive, of the thickness of the catalyst layer.

15. The fuel cell according to claim 14, wherein the thickness of the trapping layer is 50 to 100%, inclusive, of the thickness of the catalyst layer.

16. The fuel cell according to claim 11, wherein the trapping layer is adapted to trap the hydrogen peroxide ions to prevent the hydrogen peroxide ions from reaching the anion-exchange membrane.

* * * * *